US011500480B2

(12) United States Patent
Campbell et al.

(10) Patent No.: US 11,500,480 B2
(45) Date of Patent: Nov. 15, 2022

(54) COMPUTER INPUT DEVICE

(71) Applicant: ACCO Brands Corporation, Lake Zurich, IL (US)

(72) Inventors: Erik Campbell, San Francisco, CA (US); Ching-Wei Chang, Taipei (TW)

(73) Assignee: ACCO Brands Corporation, Lake Zurich, IL (US)

( * ) Notice: Subject to any disclaimer, the term of this patent is extended or adjusted under 35 U.S.C. 154(b) by 0 days.

(21) Appl. No.: 17/359,073

(22) Filed: Jun. 25, 2021

(65) Prior Publication Data

US 2021/0325982 A1 Oct. 21, 2021

Related U.S. Application Data (63) Continuation of application No. 16/695,948, filed on Nov. 26, 2019, now Pat. No. 11,048,347.

(51) Int. Cl.
| | |
|---|---|
| *A61B 8/00* | (2006.01) |
| *A61B 8/12* | (2006.01) |
| *B08B 1/00* | (2006.01) |
| *G06F 3/0354* | (2013.01) |
| *G06F 3/03* | (2006.01) |
| *G06F 3/0362* | (2013.01) |
| *G06F 3/039* | (2013.01) |

(52) U.S. Cl.
CPC .......... *G06F 3/03549* (2013.01); *G06F 3/039* (2013.01); *G06F 3/0362* (2013.01)

(58) Field of Classification Search
None
See application file for complete search history.

(56) References Cited

U.S. PATENT DOCUMENTS

| | | | |
|---|---|---|---|
| 4,612,539 A | 9/1986 | Hosogoe et al. | |
| 4,652,871 A | 3/1987 | Tsukada et al. | |
| 4,933,670 A | 6/1990 | Wislocki | |
| 5,067,573 A * | 11/1991 | Uchida | G06F 1/1626 |
| | | | 382/314 |
| 5,122,654 A | 6/1992 | Koh et al. | |
| 5,162,780 A | 11/1992 | Solhjell | |
| 5,280,276 A | 1/1994 | Kwok | |

(Continued)

FOREIGN PATENT DOCUMENTS

| | | |
|---|---|---|
| EP | 1847920 A2 | 10/2007 |
| EP | 1973029 A1 | 9/2008 |

(Continued)

OTHER PUBLICATIONS

European Patent Office Action for Application No. 20209915.6 dated Mar. 22, 2022 (5 pages).

(Continued)

*Primary Examiner* — Carl Adams
(74) *Attorney, Agent, or Firm* — Michael Best & Friedrich LLP (57) ABSTRACT

A computer input device including a housing including a first side and a second side that is spaced apart from the first side, and a ball partially positioned within and rotatable relative to the housing. At least a portion of the ball extends through an aperture in the first side. The computer input device also includes a user-operable actuator accessible from the second side of the housing and configured to eject the ball from the housing.

20 Claims, 6 Drawing Sheets

(56) References Cited

U.S. PATENT DOCUMENTS

| | | | |
|---|---|---|---|
| 5,287,090 A | 2/1994 | Grant | |
| 5,309,172 A | 5/1994 | Fox | |
| 5,428,368 A | 6/1995 | Grant | |
| 5,521,617 A | 5/1996 | Imai et al. | |
| 5,561,445 A | 10/1996 | Miwa et al. | |
| 5,648,798 A | 7/1997 | Hamling | |
| 5,668,574 A | 9/1997 | Jarlance-Huang | |
| 5,714,982 A | 2/1998 | Imai et al. | |
| 5,850,213 A | 12/1998 | Imai et al. | |
| 5,896,124 A * | 4/1999 | Strandberg | B08B 1/00 345/163 |
| D415,746 S | 10/1999 | Edwards et al. | |
| 6,148,094 A | 11/2000 | Kinsella | |
| 6,157,369 A | 12/2000 | Merminod et al. | |
| 6,157,370 A | 12/2000 | Kravtin et al. | |
| D437,598 S | 2/2001 | Han et al. | |
| D438,211 S | 2/2001 | Jones et al. | |
| D441,754 S | 5/2001 | Loughnane et al. | |
| D442,961 S | 5/2001 | Sheehan et al. | |
| D443,619 S | 6/2001 | Loughnane et al. | |
| D447,748 S | 9/2001 | Loughnane et al. | |
| D448,380 S | 9/2001 | Sheehan et al. | |
| 6,292,175 B1 | 9/2001 | Sheehan et al. | |
| D449,046 S | 10/2001 | Loughnane et al. | |
| D452,506 S | 12/2001 | Hu | |
| 6,429,848 B2 | 8/2002 | Merminod et al. | |
| D466,121 S | 11/2002 | von Ilberg et al. | |
| D470,496 S | 2/2003 | Sheehan et al. | |
| 6,525,714 B1 | 2/2003 | Varga et al. | |
| 6,556,150 B1 | 4/2003 | McLoone et al. | |
| 6,590,564 B1 | 7/2003 | McLoone et al. | |
| 6,680,728 B1 | 1/2004 | Lilenfeld | |
| 6,788,288 B2 | 9/2004 | Ano | |
| 6,809,722 B2 | 10/2004 | Mei et al. | |
| 6,950,093 B2 | 9/2005 | Song | |
| 7,084,856 B2 | 8/2006 | Huppi | |
| 7,286,114 B2 | 10/2007 | Lee | |
| RE40,324 E | 5/2008 | Crawford | |
| 7,385,587 B1 | 6/2008 | Adapathya et al. | |
| 7,508,372 B2 | 3/2009 | Plandin | |
| 8,054,292 B1 | 11/2011 | Forde et al. | |
| D667,410 S | 9/2012 | Altaai | |
| D681,039 S | 4/2013 | Altaai | |
| 8,446,366 B2 | 5/2013 | Blandin et al. | |
| 8,614,667 B2 | 12/2013 | McAlindon | |
| 8,638,295 B2 | 1/2014 | Bruss et al. | |
| 8,780,044 B2 | 7/2014 | Lee | |
| 8,902,165 B1 | 12/2014 | Pflughaupt | |
| 9,261,986 B2 | 2/2016 | Kumazawa et al. | |
| 9,383,838 B2 | 7/2016 | Blandin | |
| 9,639,185 B2 | 5/2017 | McClain et al. | |
| D804,480 S | 12/2017 | Deng | |
| D829,801 S | 10/2018 | Park | |
| D882,575 S | 4/2020 | Jinkinson et al. | |
| 2002/0060663 A1 | 5/2002 | Wang | |
| 2002/0084976 A1 | 7/2002 | Lin | |
| 2002/0113775 A1 | 8/2002 | Spencer | |
| 2003/0197682 A1 | 10/2003 | Huang | |
| 2004/0155865 A1 | 8/2004 | Swiader | |
| 2005/0030288 A1 | 2/2005 | Johnson | |
| 2005/0151725 A1 | 7/2005 | Jennings | |
| 2005/0190155 A1 | 9/2005 | Pollenz | |
| 2007/0080946 A1 | 4/2007 | Fyke et al. | |
| 2007/0236479 A1 | 10/2007 | Wang et al. | |
| 2007/0242045 A1 | 10/2007 | Chien et al. | |
| 2007/0254705 A1 | 11/2007 | Griffin et al. | |
| 2007/0259697 A1 | 11/2007 | Griffin et al. | |
| 2008/0136778 A1 | 6/2008 | Hursh | |
| 2009/0027343 A1 | 1/2009 | Cho et al. | |
| 2011/0105231 A1 | 5/2011 | Ambinder et al. | |
| 2012/0038495 A1 | 2/2012 | Ishikawa | |
| 2013/0321272 A1 | 12/2013 | Deng | |
| 2018/0103929 A1 * | 4/2018 | Kitahara | G06F 3/0312 |
| 2018/0356909 A1 | 12/2018 | Dayer et al. | |

FOREIGN PATENT DOCUMENTS

| | | | |
|---|---|---|---|
| EP | 2090963 A1 | 8/2009 | |
| EP | 2261773 A1 | 12/2010 | |
| JP | 2004265017 A | 9/2004 | |
| JP | 2004302627 A | 10/2004 | |
| JP | 2010165033 A | 7/2010 | |
| WO | 9109363 A1 | 6/1991 | |
| WO | 9202007 A1 | 2/1992 | |
| WO | 9859316 A1 | 12/1998 | |
| WO | 126089 A1 | 4/2001 | |
| WO | 163591 A1 | 8/2001 | |
| WO | 3007143 A1 | 1/2003 | |
| WO | 3010648 A1 | 2/2003 | |
| WO | 2018157384 A1 | 9/2018 | |

OTHER PUBLICATIONS

Office Action from the US Patent and Trademark Office for U.S. Appl. No. 29/714,840 dated Jan. 7, 2021 (16 pages).

European Patent Office Extended Search Report for Application No. 20209915.6 dated Apr. 29, 2021 (8 pages).

* cited by examiner

COMPUTER INPUT DEVICE

This application is a continuation of co-pending U.S. patent application Ser. No. 16/695,948, filed Nov. 26, 2019, the entire contents of which is incorporated by reference herein.

FIELD OF THE DISCLOSURE

The present disclosure relates to a computer input device. In particular, the present disclosure relates to a trackball for use with a computer system.

SUMMARY

In one aspect, a computer input device includes a housing that has a first side and a second side that is spaced apart from the first side, and a ball partially positioned within and rotatable relative to the housing. At least a portion of the ball extends through an aperture in the first side. The computer input device also includes a user-operable actuator accessible from the second side of the housing and configured to eject the ball from the housing.

In another aspect, a computer input device includes a housing that has a first side and a second side that is spaced apart from the first side and a ball partially positioned within and rotatable relative to the housing. At least a portion of the ball extends through an aperture in the first side. The computer input device also includes an actuator extending through the housing and including a first end that is accessible through the second side and a second end that selectively engages the ball, wherein the actuator is movable relative to the housing such that the second end engages the ball to remove the ball from the housing.

In yet another aspect, a method is disclosed for removably coupling a ball from a computer input device, which includes a housing having a first side and a second side spaced apart from the first side, and at least a portion of the ball extends through the first side. The method includes providing an actuator that extends through the housing, where the actuator includes a first end that is accessible through the second side and a second end that selectively engages the ball. The method further includes moving the actuator relative to the housing such that the second end engages the ball to remove the ball from the housing.

In addition, other aspects of the disclosure will become apparent by consideration of the detailed description and accompanying drawings.

DETAILED DESCRIPTION

Before any aspects of the disclosure are explained in detail, it is to be understood that the disclosure is not limited in its application to the details of construction and the arrangement of components set forth in the following description or illustrated in the following drawings. The disclosure is capable of supporting other aspects and being practiced or being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described aspects.

FIGS. 1-5 illustrate a computer input device 10, which is illustrated as a trackball, that is configured to be used with a computer system and has a ball 12 that is movable (e.g., rotatable) to communicate with a monitor of the computer system. The trackball 10 includes a housing 14 that supports a ball 12. The housing 14 includes a longitudinal axis A, a first side 18 (e.g., top side), a second side 22 (e.g., bottom side) spaced apart from the first side 18, a third side 26 (e.g., right side), and a fourth side 30 (e.g., left side) spaced apart from the third side 26. The top and bottom sides 18, 22 are positioned between the right and left sides 26, 30. The top side 18 defines a plane 34 and includes a depression 38, and an aperture 42 (FIGS. 6 and 7) positioned within the depression 38 and extending through top side 18. The bottom side 22 is configured to support the trackball 10 on a support surface (e.g., a desk or the like), and has a surface that defines a plane 46 that is parallel to the support surface. In the illustrated, embodiment, the plane 34 of the top side 18 is positioned at a non-parallel angle relative to the support surface (e.g., at an oblique angle). In other embodiments, the plane 34 may be parallel to the support surface. In still other embodiments, the plan 34 may be perpendicular or nearly perpendicular to the support surface. Further, the bottom side 22 includes a power switch 50, a WIFI button 54, and a dots per inch (DPI) button 58. The left side 30 and the right side 26 both extend from both the top side 18 and the bottom side 22 at oblique angles. The right side 26 includes a first button 62 (e.g., a right-click button) and a second button 66 (e.g., a left-click button) on opposite sides of a rotatable wheel 70. The housing 14 also includes additional buttons 74, 78 positioned in between the right side 26 and the top side 18 and between the left side 30 and the top side 18. In other embodiments, the trackball 10 may have other types and/or numbers of buttons, and the buttons may be arranged in different configurations on the housing 14. The right side 26 is configured to receive a portion of a user's hand, and the top side 18 is configured to receive another portion of the user's hand. In particular, the right side 26 is sized, shaped, and contoured to comfortably support a user's palm and fingers and the top side 18 is sized, shaped, and contoured to comfortably receive a user's thumb.

Figure 1:
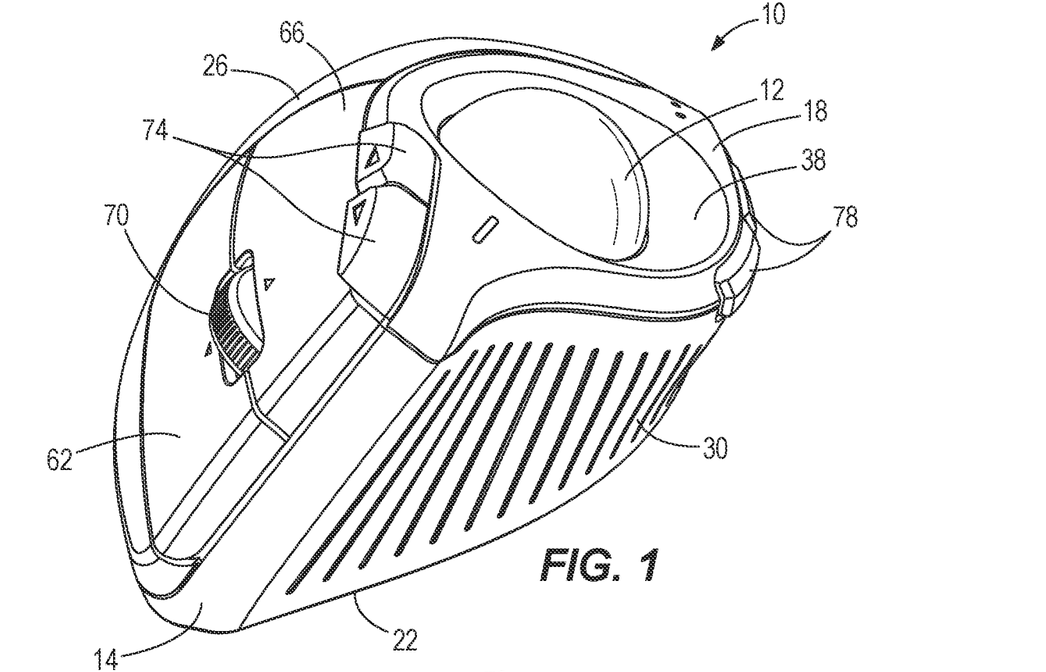
FIG. 1 illustrates a front perspective view of a computer input device according to an embodiment of the invention.
Figure 2:
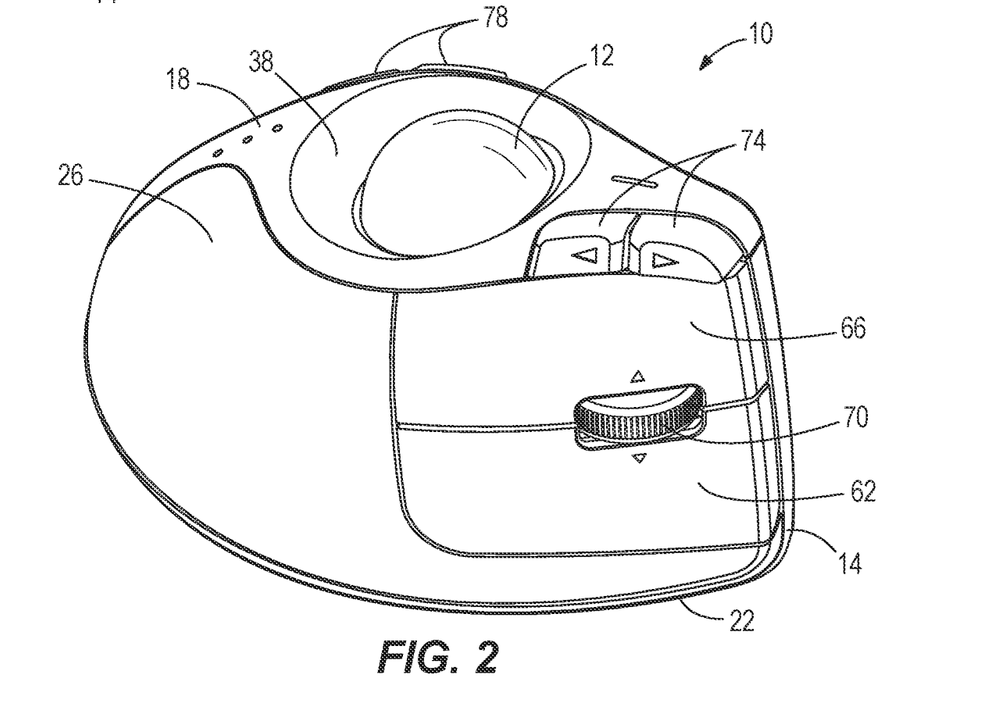
FIG. 2 illustrates another front perspective view of the computer input device of FIG. 1.
Figure 3:
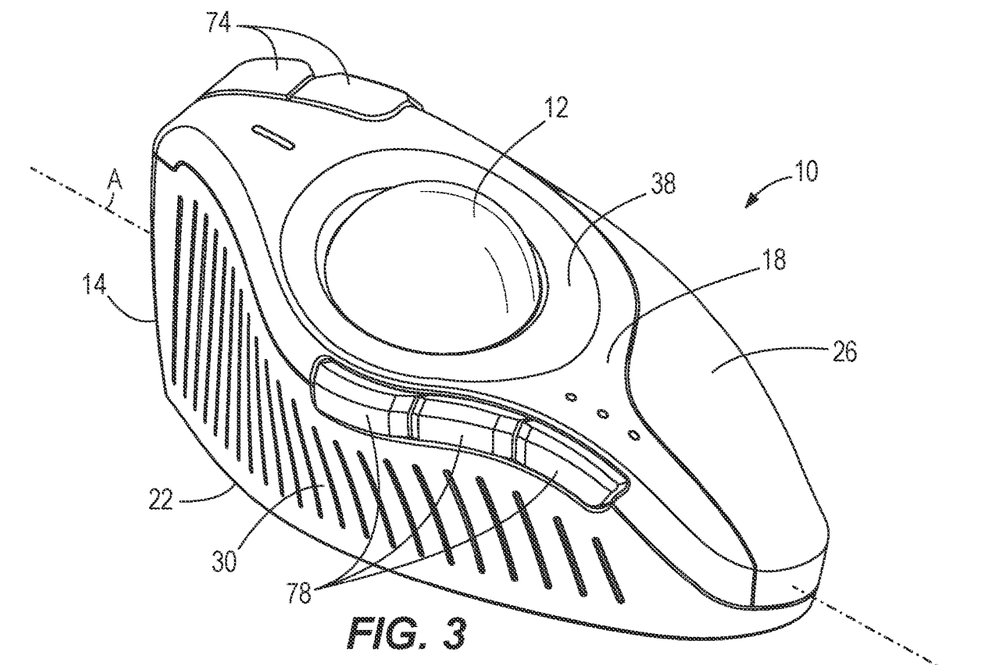
FIG. 3 illustrates a rear perspective view of the computer input device of FIG. 1.
Figure 4:
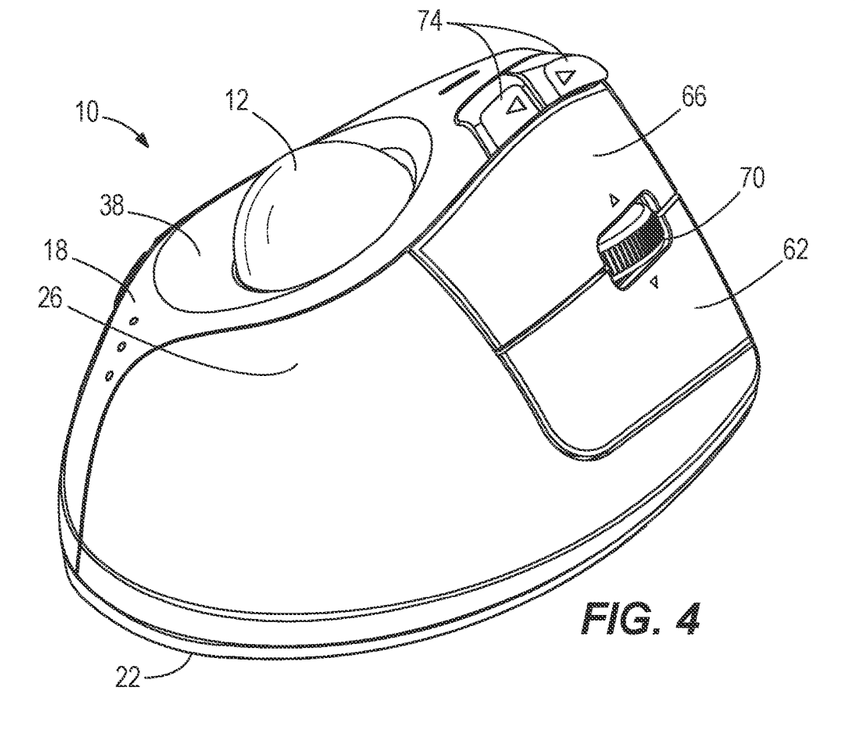
FIG. 4 illustrates another rear perspective view of the computer input device of FIG. 1.
Figure 5:
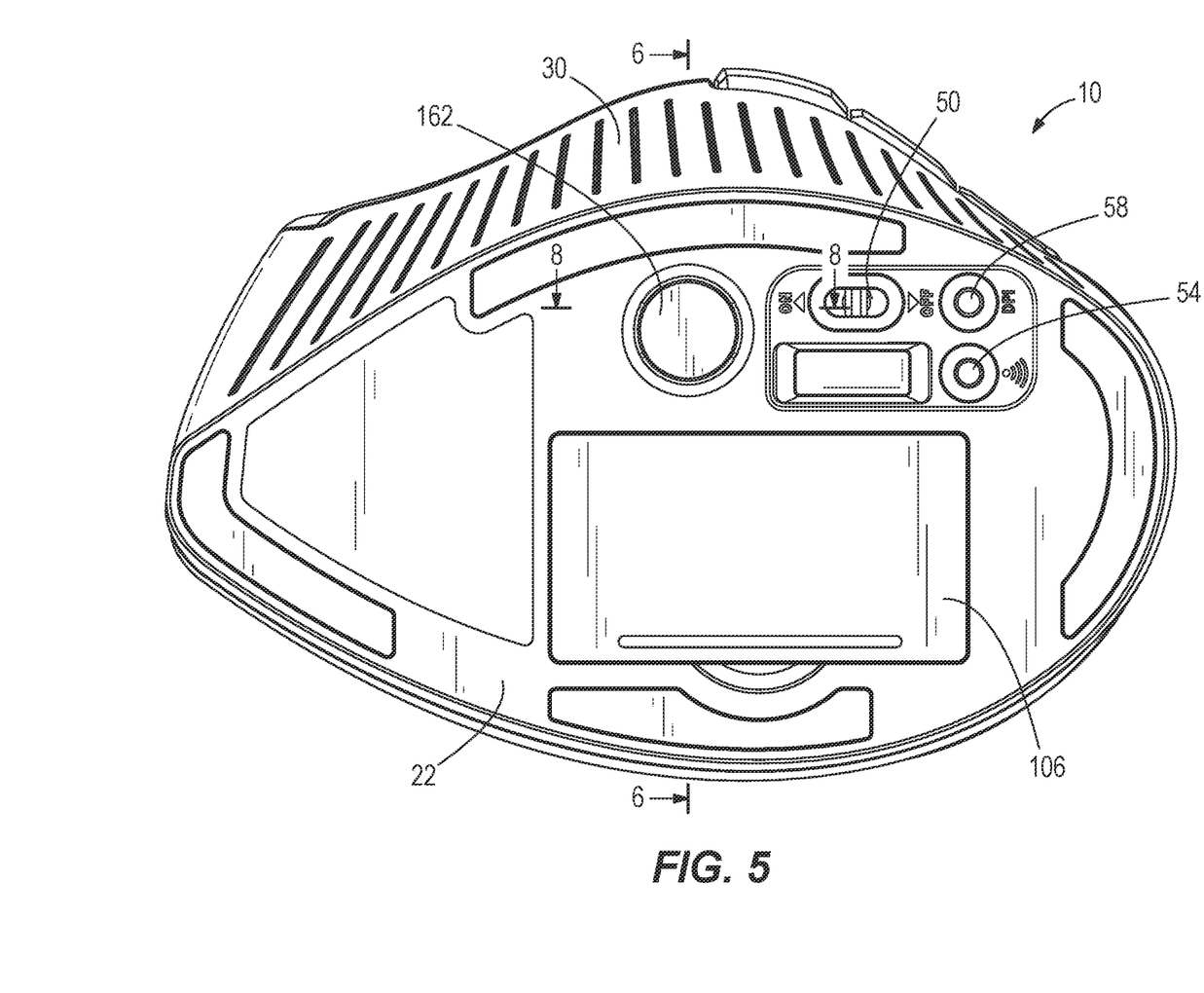
FIG. 5 illustrates a bottom view of the computer input device of FIG. 1.
Figure 6:
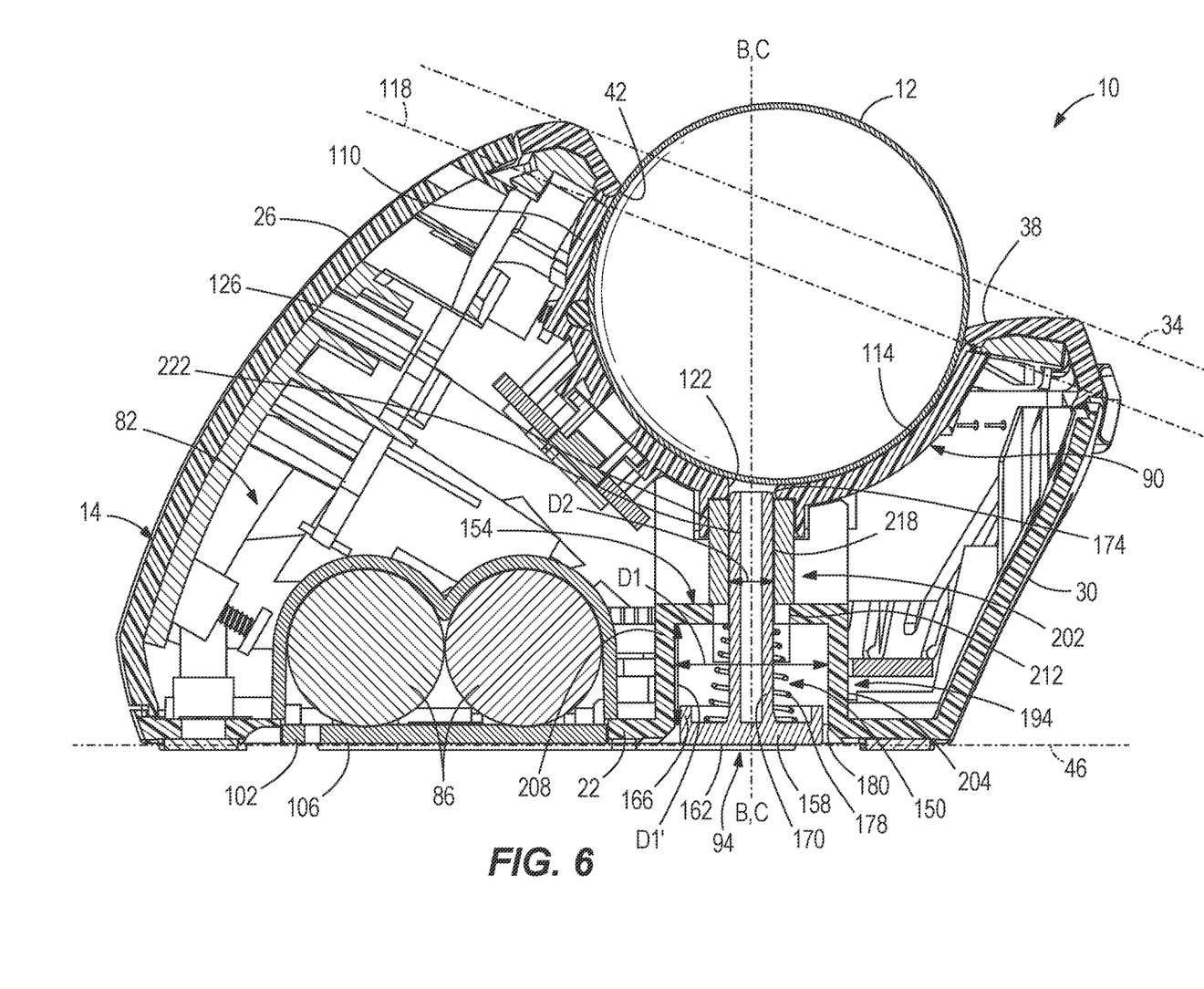
FIG. 6 illustrates a cross-sectional view of the computer input device of FIG. 1 along the line 6-6 of FIG. 5.
Figure 7:
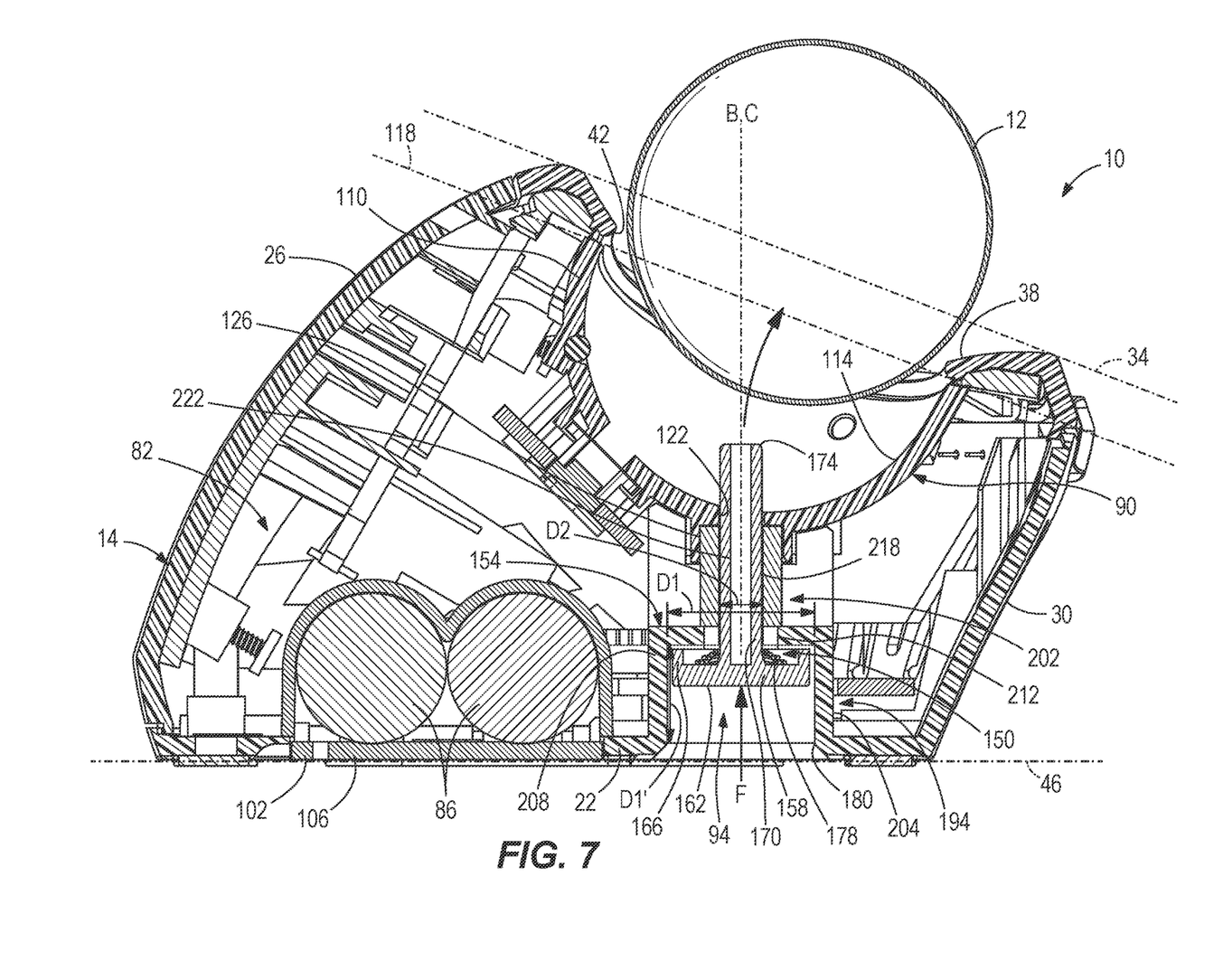
FIG. 7 illustrates another cross-sectional view of the computer input device of FIG. 1 along the line 6-6 of FIG. 5, showing an ejection mechanism ejecting a ball.

With respect to FIGS. 6-7, positioned within an interior 82 of the housing 14 is a power source 86, a printed circuit board (not shown), a ball support 90, and an ejection mechanism 94. In the illustrated embodiment, the power source 86 comprises one or more batteries that power the trackball 10. The batteries are removable from the housing 14 and replaceable via an aperture 102 that extends through the bottom side 22. The aperture 102 is selectively closed by a cover 106 coupled to the bottom side 22. In additional or alternative embodiment, the trackball 10 may be powered by a cord that is coupled to and extends between the housing 14 and an input port of the computer system. The printed circuit board allows communication between the trackball 10 and the computer system. For example, the printed circuit board may include a chip for wirelessly communicating with the computer system via Bluetooth® or other suitable wireless protocols.

Further with respect to FIGS. 6-7, the ball support 90 is coupled to and extends from the top side 18 of the housing 14 into the interior of the housing 14. The ball support 90 has an arcuately shaped body 110 that defines a recess 114 having a closed end positioned within the interior 82 and an open end that is positioned adjacent to the top side 18 and concentric with the aperture 42 in the top side 18 of the housing 14. A plane 118 defined at the open end of the ball support 90 is positioned at a non-perpendicular and non-parallel angle (i.e., an oblique angle) relative to the plane 46 of the bottom side 22 and is substantially parallel to the plane 34 of the top side 18. The recess 114 of the ball support 90 and aperture 42 in the top side 18 of the housing 14 are configured to movably (e.g., rotatably) receive the ball 12. That is, the ball 12 is rotatably supported within the recess 114 of the ball support 90 such that a portion of the ball 12 extends and is accessible from the top side 18 of the housing 14. The ball support 90 further includes an aperture 122 that extends through the body 110. An axis B defined through the aperture 122 is positioned at a non-perpendicular and non-parallel angle (i.e., an oblique angle) relative to the plane 118 of the ball support 90, but is perpendicular to the plane 46 of the bottom side 22. A flange 126 is integrally coupled to the body 110 around the aperture 122.

Figure 8:
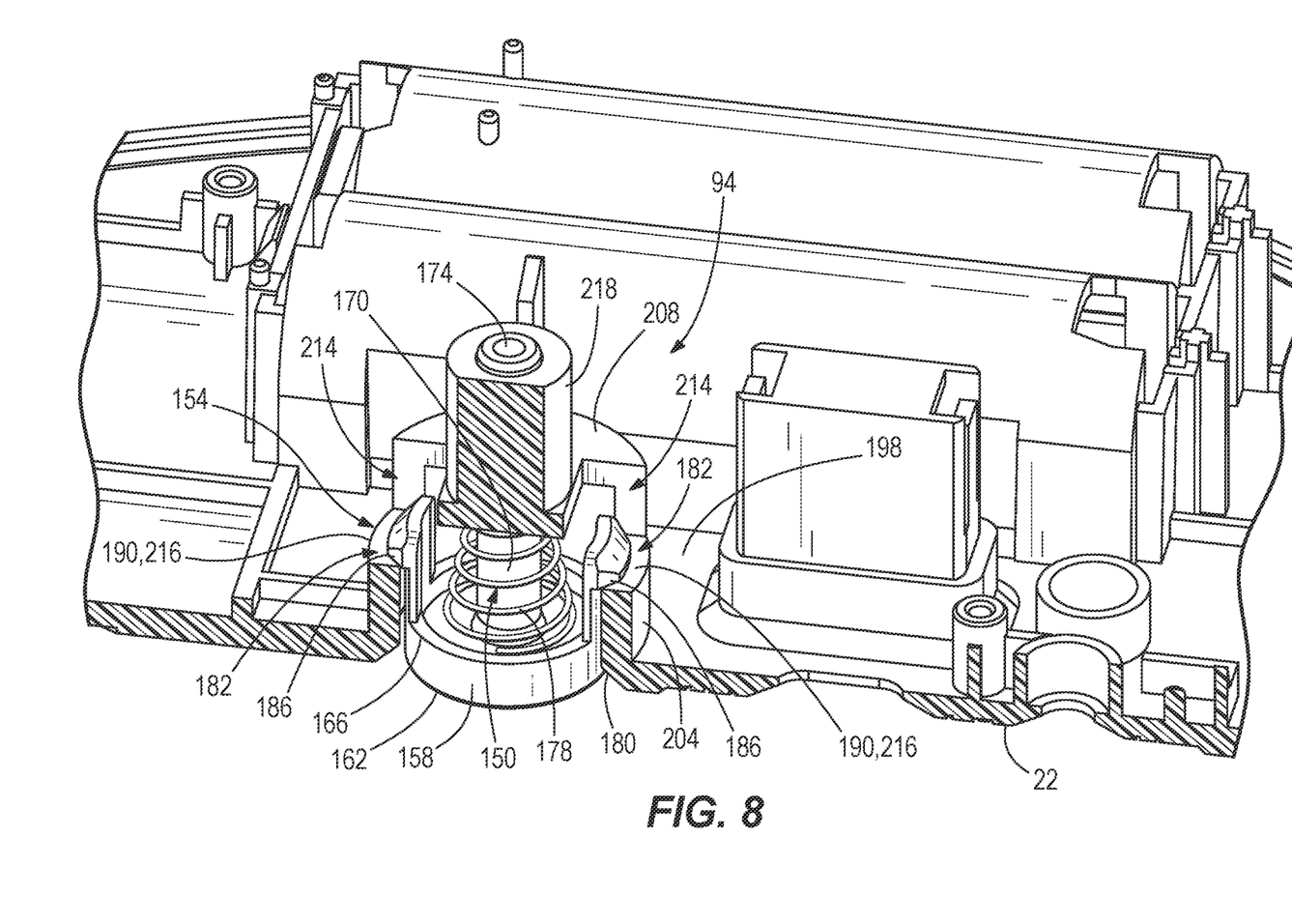
FIG. 8 illustrates another cross-sectional view of the computer input device of FIG. 1 along the line 8-8 of FIG. 5.

As shown in FIGS. 6-8, the ejection mechanism 94 includes an actuator (e.g., plunger) 150 and an actuator housing 154 (e.g., plunger housing). The plunger 150 has a first end 158 that defines an actuating surface 162, a lip 166 extending from the first end 158, and an elongate member 170 extending from the first end 158 to a second end 174. A biasing member (e.g., spring) 178 is supported by the first end 158. The first end 158 and the actuating surface 162 thereof are accessible through an opening 180 in the bottom side 22, as will be discussed below. In other embodiments, the actuating surface 162 may be accessible on another side of the housing 14. A longitudinal axis C of the plunger 150 extends along its length. With respect to FIG. 8, the plunger 150 also has a retaining mechanism 182. In the illustrated embodiment, the retaining mechanism 182 includes a pair of hooks that extend from the lip 166 parallel to the axis C. As discussed in greater detail below, the hooks each have an engagement surface 186, each of which engages a stop surface 190 within the housing 14 to limit the movement of the plunger 150.

In the illustrated embodiment, the plunger housing 14 includes a first portion 194 extending from an interior surface 198 of the bottom side 22 of the housing 14 and a second portion 202 extending from the first portion 194. As shown in FIGS. 6-8, the first portion 194 includes a substantially cylindrical and vertical wall 204 extending from the interior surface 198 into the housing 14 and a top wall 208 coupled to the vertical wall 204. The vertical wall 204 defines the opening 180 that receives the first end 158 and has a first diameter D1. The first portion 194 is sized and shaped to movably receive the first end 158 of the plunger 150. In the illustrated embodiment, the vertical wall 204 is integrally formed with the bottom side 22, but in other or additional embodiments, the vertical wall 204 may be otherwise coupled to the interior surface 198 bottom side 22. The top wall 208 is spaced apart from the bottom side 22. An aperture 212 extends through the top wall 208, and a pair of openings 214 are positioned on opposite sides of the aperture 212 and extend through the walls 204, 208. An edge 216 of each of the openings 214 defines the stop surface 190 in the illustrated embodiment. The second portion 202 includes a hollow cylindrical body 218 with an aperture 222 extending therethrough. The aperture 222 has a second diameter D2 that is smaller than the first diameter D1 and sized and shaped to receive and guide the elongate member 170 of the plunger 150. The second portion 202 is coupled to and supported by the flange 126. The apertures 122, 212, 222 of the ball support 90, the first portion 194, and the second portion 202 are aligned with one another along the axis B.

The first end 158 of the plunger 150 and the biasing mechanism 178 are positioned within the first portion 194 of the plunger housing 154. The elongate member 170 extends from the first end through the apertures 212, 222 in the first and second portions 194, 198 of the plunger housing 154 such that the second end 174 is positioned within or adjacent the aperture 122 in the ball support 90. Accordingly, the longitudinal axis C of the elongate member 170 is aligned with the axis B of the aperture 122 of the ball support 90. Also, the longitudinal axis C of the plunger 150 is perpendicular to the plane 46 of the bottom side 22 and positioned at a non-perpendicular angle relative to the planes 34, 118 of the top side 18 and the ball support 90. The plunger 150 is selectively movable within the housing 14 along the axis C.

The plunger 150 is movable between a first, retracted position (FIG. 6) and a second, extended position (FIG. 7) to remove the ball 12 from the housing 14. In the retracted position, the biasing mechanism 178 biases the plunger 150 such that first end 158 is seated within the aperture in the bottom side 22, the actuating surface 162 is flush (or nearly flush) with the surface of the bottom side 22, and the second end 174 is positioned within or adjacent to the aperture 122 in the ball support 90 and spaced apart from the ball 12. As shown in FIG. 6, in the retracted position the first end 158 of the plunger 150 is spaced apart from the top wall 208 of the first portion 194 of the plunger housing 154. In other embodiments, the first end 158 of the plunger 150 may be flush (or nearly flush) with the top wall 208 of the plunger housing 154 while in the retracted position. With respect to FIG. 8, the engagement surfaces 186 of the retaining mechanism 182 engage the edges 216 of the openings 214 in the plunger housing 154, when in the plunger 150 retracted position.

In the extended position, the first end 158 and the actuating surface 162 are positioned within the first portion 194 and the second end 174 is positioned in the recess 114 of the ball support 90. Also, in the extended position, the first end 158 is adjacent to the top wall 204, and the lip 166 may abut the wall 204.

In operation, a user moves the plunger 150 from the retracted position to the extended position by exerting a force on the actuating surface as indicated by the direction of arrow F. The force is parallel to the axes B, C and perpendicular to the plane 46 of the bottom side 22. The force on the actuating surface 162 overcomes the bias of the biasing mechanism 178 such that plunger 150 moves in the direction of the force and the second end 174 engages the ball 12 to eject or remove the ball 12 from the recess 114 (as shown in FIG. 7). Once the force is released, the biasing mechanism 178 returns the plunger 150 to the retracted position (FIG. 6). With the ball 12 removed from the housing 14, the ball 12 can be cleaned before being reinserted into the recess 114. The ball 12 can be returned to the housing 14 (or a replacement ball can be inserted into the housing 14) by pressing the ball into the recess 114 with sufficient force.

Although the disclosure has been described in detail with reference to certain preferred aspects, variations and modifications exist within the scope and spirit of one or more independent aspects of the disclosure as described. Various features and advantages of the disclosure are set forth in the following claims.

What is claimed is:

1. A computer input device comprising:
    a housing including a first side and a second side that is spaced apart from the first side, the second side configured to support the housing on a support surface;
    a ball partially positioned within and rotatable relative to the housing, at least a portion of the ball extending through an aperture in the first side; and
    an actuator extending through the housing and including a first end that is accessible through the second side and a second end that selectively engages the ball;
    wherein the actuator is movable in a direction toward the aperture such that the second end engages the ball to push the ball from the housing.

2. The computer input device of claim 1, wherein the actuator is movable between a first position, in which the second end is spaced apart from the ball, and a second position, in which the second end engages the ball to push the ball from the housing.

3. The computer input device of claim 2, wherein the actuator defines an axis that is perpendicular to the second side of the housing, and wherein the actuator is movable along the axis between the first position and the second position.

4. The computer input device of claim 1, wherein the actuator further includes a retaining mechanism that engages a stop surface within the housing to inhibit removal of the actuator from the housing.

5. The computer input device of claim 4, wherein the retaining mechanism includes a hook extending from the first end of the actuator towards the second end, the hook including an engagement surface that engages the stop surface.

6. The computer input device of claim 1, further comprising a biasing mechanism that biases the second end of the actuator away from the ball.

7. The computer input device of claim 6, wherein the actuator is movable toward the aperture by exerting a force on the first end of the actuator to overcome a bias of the biasing mechanism.

8. The computer input device of claim 7, wherein the force is exerted in a direction parallel to a longitudinal axis of the actuator and perpendicular to the second side of the housing.

9. The computer input device of claim 1, further comprising a ball support coupled to and extending from the first side of the housing, the ball support configured to rotatably support the ball, the ball support including an aperture that selectively receives the second end of the actuator.

10. A computer input device comprising:
    a housing including a first side and a second side that is spaced apart from the first side, the second side configured to support the housing on a support surface;
    a ball partially positioned within and rotatable relative to the housing, at least a portion of the ball extending through an aperture in the first side; and
    a user-operable actuator accessible from the second side of the housing and defining an axis that is perpendicular to the second side of the housing, the user-operable actuator configured move in a direction parallel to the axis of the actuator and perpendicular to the second side of the housing to eject the ball from the housing.

11. The computer input device of claim 10, wherein the actuator includes a first end that defines an actuating surface positioned within an aperture in the second side of the housing and an elongate member extending from the first end to a second end within the housing.

12. The computer input device of claim 11, wherein the first end of the actuator supports a biasing mechanism within the housing.

13. The computer input device of claim 12, wherein the actuator is movable between a first position, in which the second end is spaced apart from the ball, and a second position, in which the second end engages the ball to push the ball from the housing, and wherein the biasing mechanism biases the actuator toward the first position.

14. The computer input device of claim 13, wherein the actuator is movable from the first position to the second position by exerting a force on the actuating surface of the actuator to overcome a bias of the biasing mechanism.

15. The computer input device of claim 10, wherein the longitudinal axis is at a non-perpendicular angle relative to a plane defined by the first side.

16. A computer input device comprising:
    a housing including a first side and a second side that is spaced apart from the first side;
    a plunger housing at least partially defined by the housing, the plunger housing having an opening positioned in the second side and a wall positioned within the housing opposite the opening;
    a ball partially positioned within and rotatable relative to the housing, at least a portion of the ball extending through an aperture in the first side; and
    a plunger including a first end that is positioned within and movable relative to the plunger housing and an elongate member extending from the first end to a second end through the wall in the plunger housing into the housing, the first end defining an actuating surface accessible through the opening;
    wherein a force exerted on the actuating surface moves the plunger between a first position, in which the second end is spaced apart from the ball, and a second position, in which the second end engages the ball to remove the ball from the housing.

17. The computer input device of claim 16, wherein the elongate member defines an axis that is perpendicular to the actuating surface and the second side of the housing, and wherein the plunger is movable along the axis between the first position and the second position.

18. The computer input device of claim 16, wherein the plunger further includes a first engagement surface that engages a stop surface of the plunger housing in the first position to limit movement of the plunger.

19. The computer input device of claim 18, wherein the plunger further includes a second engagement surface that engages the wall of the plunger housing in the second position.

20. The computer input device of claim 16, further comprising a biasing mechanism positioned between the wall of the plunger housing and the first end of the plunger, the biasing mechanism biasing the plunger into the first position.

* * * * *